United States Patent
Nassar et al.

(10) Patent No.: US 8,743,974 B2
(45) Date of Patent: Jun. 3, 2014

(54) ADAPTIVE MODULATION AND CODING WITH FRAME SIZE ADJUSTMENT FOR POWER LINE COMMUNICATIONS (PLC)

(75) Inventors: Marcel Nassar, Austin, TX (US); Il Han Kim, Dallas, TX (US); Tarkesh Pande, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 101 days.

(21) Appl. No.: 13/597,165

(22) Filed: Aug. 28, 2012

(65) Prior Publication Data
US 2013/0051482 A1 Feb. 28, 2013

Related U.S. Application Data

(60) Provisional application No. 61/528,514, filed on Aug. 29, 2011.

(51) Int. Cl.
*H04L 25/00* (2006.01)
*H04B 3/00* (2006.01)

(52) U.S. Cl.
USPC ........... 375/257; 375/258; 375/295; 375/316; 455/114.3; 455/522

(58) Field of Classification Search
USPC ........ 375/257, 258, 295, 316; 455/114.3, 522
See application file for complete search history.

(56) References Cited

U.S. PATENT DOCUMENTS

| | | | | |
|---|---|---|---|---|
| 7,675,979 | B1 * | 3/2010 | Yu et al. | 375/259 |
| 8,213,868 | B2 * | 7/2012 | Du et al. | 455/63.1 |
| 8,619,845 | B2 * | 12/2013 | Corral | 375/224 |
| 2013/0279546 | A1 * | 10/2013 | Rieken | 375/146 |

* cited by examiner

*Primary Examiner* — Ted Wang
(74) *Attorney, Agent, or Firm* — Steven A. Shaw; Wade James Brady, III; Frederick J. Telecky, Jr.

(57) ABSTRACT

Systems and methods for adaptive modulation and coding with frame size adjustment are described. In various implementations, these systems and methods may be applicable to Power Line Communications (PLC). For example, a method may include identifying a temporal region of a cyclostationary noise over which a frame is to be sent across a PLC network, the cyclostationary noise having a plurality of temporal regions, each of the plurality of temporal regions having a distinct spectral shape. The method may also include applying a given one of a plurality of Modulation and Coding Schemes (MCSs) to the frame to produce a modulated frame, wherein the given one of the plurality of MCSs is selected based, least in part, upon the spectral shape corresponding to the identified temporal region. The method may further include transmitting the modulated frame across the PLC network, at least in part, over the identified temporal region.

20 Claims, 7 Drawing Sheets

ADAPTIVE MODULATION AND CODING WITH FRAME SIZE ADJUSTMENT FOR POWER LINE COMMUNICATIONS (PLC)

CROSS-REFERENCE TO RELATED APPLICATIONS

This application claims the benefit of the filing date of U.S. Provisional Patent Application No. 61/528,514 titled "Adaptive Modulation and Coding with Frame Size Adjustment for PLC Applications" and filed on Aug. 29, 2011, the disclosure of which is hereby incorporated by reference herein in its entirety.

TECHNICAL FIELD

This specification is directed, in general, to network communications, and, more specifically, to systems and methods for adaptive modulation and coding with frame size adjustment in Power Line Communications (PLC).

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.995) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for adaptive modulation and coding with frame size adjustment in Power Line Communications (PLC) are described. In an illustrative, non-limiting embodiment, a method may include identifying a temporal region of a cyclostationary noise over which a frame is to be sent across a PLC network, the cyclostationary noise having a plurality of temporal regions, each of the plurality of temporal regions having a distinct spectral shape. The method may also include applying a given one of a plurality of Modulation and Coding Schemes (MCSs) to the frame to produce a modulated frame, where the given one of the plurality of MCSs is selected based, least in part, upon the spectral shape corresponding to the identified temporal region. The method may further include transmitting the modulated frame across the PLC network, at least in part, over the identified temporal region.

In some implementations, the given one of the plurality of MCSs may be selected such that a data rate with which the frame is transmitted is inversely proportional to a Signal to Noise Ratio (SNR) corresponding to the identified temporal region. Additionally or alternatively, the given one of the plurality of MCSs may be selected to avoid using spectral components of the spectral shape corresponding to the identified temporal region.

In some cases, the identified temporal region may include a background noise region, and the given one of the plurality of MCSs may be selected from the group consisting of: Amplitude and Phase Shift Keying (APSK) and Quadrature Amplitude Modulation (QAM). In other cases, the identified temporal region may include an interference noise region, and the given one of the plurality of MCSs may be selected from the group consisting of: Binary Phase Shift Keying (BPSK), and Quadrature Phase Shift Keying (QPSK). In yet other cases, the identified temporal region may include an impulse region, and the given one of the plurality of MCSs may be a Binary Phase Shift Keying (BPSK).

Prior to applying the given one of the plurality of MCSs to the frame, the method may include a size of the frame such that the frame does not occupy two or more of the plurality of temporal regions. Also, prior to transmitting the modulated frame, the method may include synchronizing one or more parameters of the cyclostationary noise with a receiving PLC device.

In another illustrative, non-limiting embodiment, a method may include transmitting a frame over a PLC network, the frame including a first portion and a second portion, the first portion transmitted during a first temporal region of a cyclostationary noise and the second portion transmitted during a second temporal region of the cyclostationary noise, the first and second temporal regions of the cyclostationary noise having different spectral shapes, the first portion of the frame transmitted with a first MCS matching the spectral shape of the first temporal region, the second portion of the frame transmitted with a second MCS matching the spectral shape of the second temporal region, and the first MCS different from the second MCS. In some embodiments, the first and second MCSs may be selected such that data rates with which the first and second portions of the frame are transmitted are maximized to achieve desired Bit Error Rates (BERs) during the first and second temporal regions, respectively. Additionally or alternatively, the first MCS may be configured to avoid components of the spectral shape corresponding to the first temporal region, and the second MCS may be configured to avoid components of the spectral shape corresponding to the second temporal region.

In some cases, the first temporal region may be a background noise region, the first MCS may be selected from the group consisting of: APSK and QAM, the second temporal region may be an interference noise region, and the second MCS may be selected from the group consisting of: BPSK and QPSK. In other cases, the first temporal region may be an interference noise region, the first MCS may be selected from the group consisting of: BPSK and QPSK, the second temporal region may be a broadband impulse region, and the second MCS may be a BPSK. The method may also include transmitting, in the frame, an indication of a duration of at least one of the first or second portions. Additionally or alternatively, the method may include transmitting, in the frame, an indication of at least one of the first or second MCSs.

In yet another illustrative, non-limiting embodiment, a method may include receiving a modulated frame over at least one of a plurality of temporal regions of a cyclostationary noise, each of the plurality of temporal regions having a corresponding spectral shape, and applying a selected one of a plurality of MCSs to the modulated frame to produce a demodulated frame, wherein the selected MCS is chosen, at least in part, as a function of the at least one of the plurality of temporal regions. For example, the at least one of the plurality of temporal regions may include a first and second temporal regions and applying the selected one of the plurality of MCSs to the modulated frame may include applying a first MCS to a first portion of the frame received over the first temporal region and applying a second MCS to a second portion of the frame received over the second temporal region, the first MCS different from the second MCS.

In some embodiments, one or more communications devices or computer systems may perform one or more of the techniques described herein. In other embodiments, a tangible computer-readable or electronic storage medium may have program instructions stored thereon that, upon execution by one or more communications devices or computer systems, cause the one or more communications devices or computer systems to execute one or more operations disclosed herein. In yet other embodiments, a communications system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
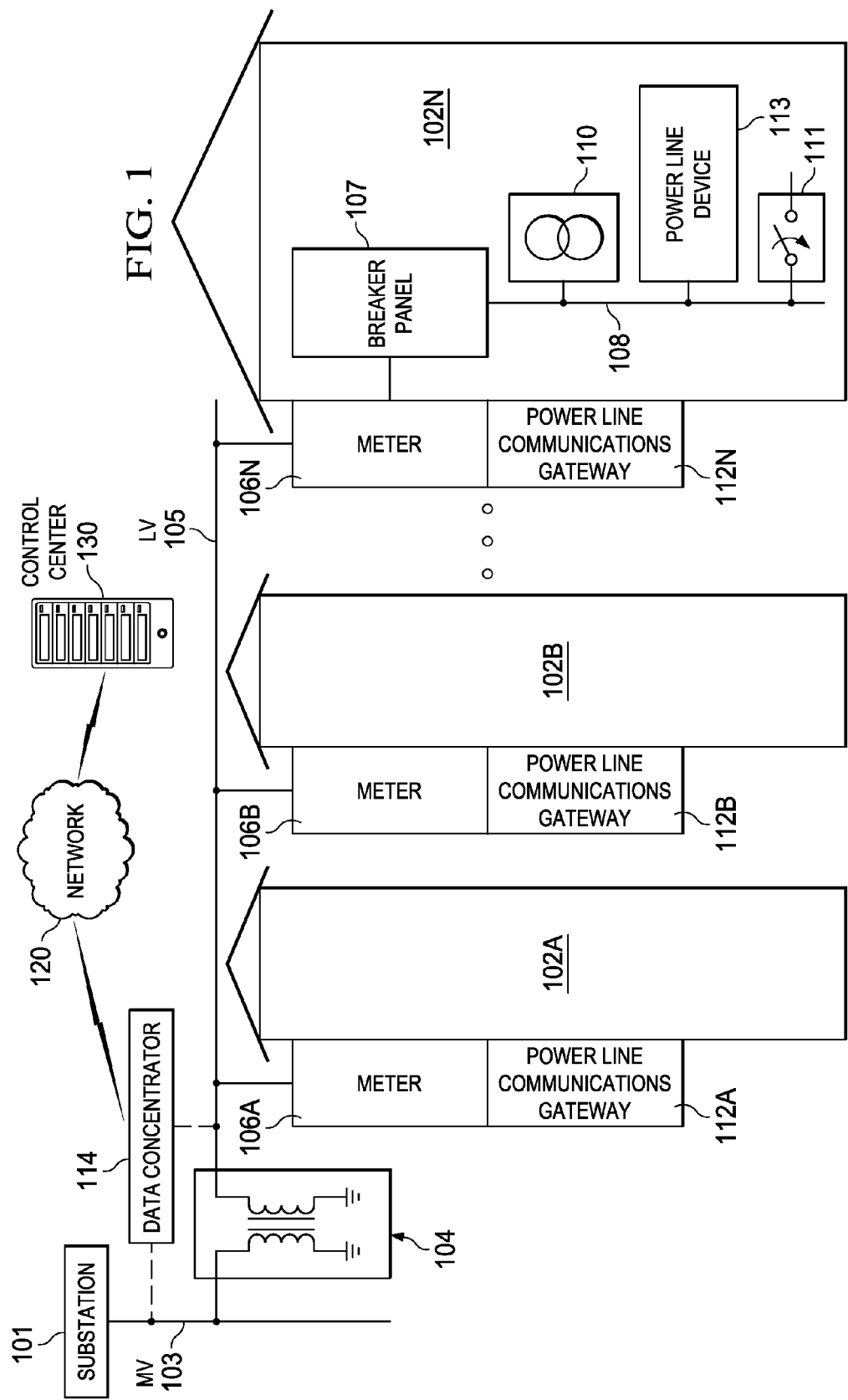

Having thus described the invention(s) in general terms, reference will now be made to the accompanying drawings, wherein:

FIG. 1 is a block diagram of a power line communication (PLC) environment according to some embodiments.

Figure 2:
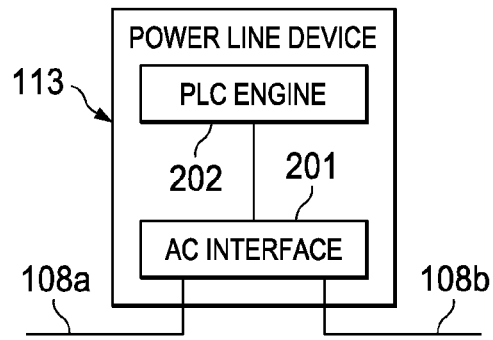

FIG. 2 is a block diagram of a PLC device or modem according to some embodiments.

Figure 3:
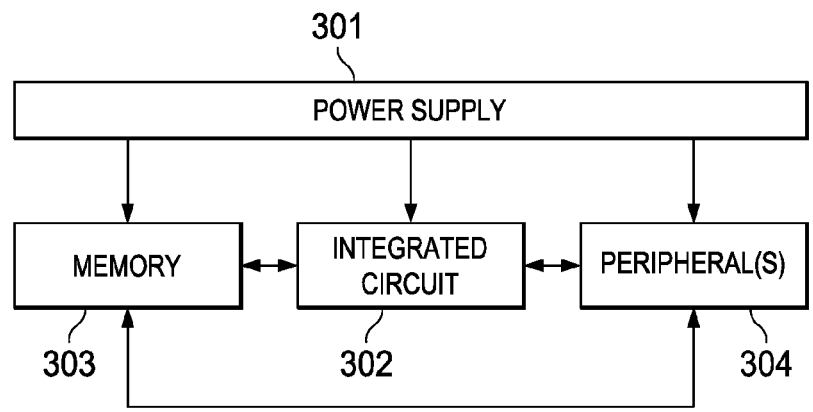

FIG. 3 is a block diagram of an integrated circuit according to some embodiments.

Figure 4:
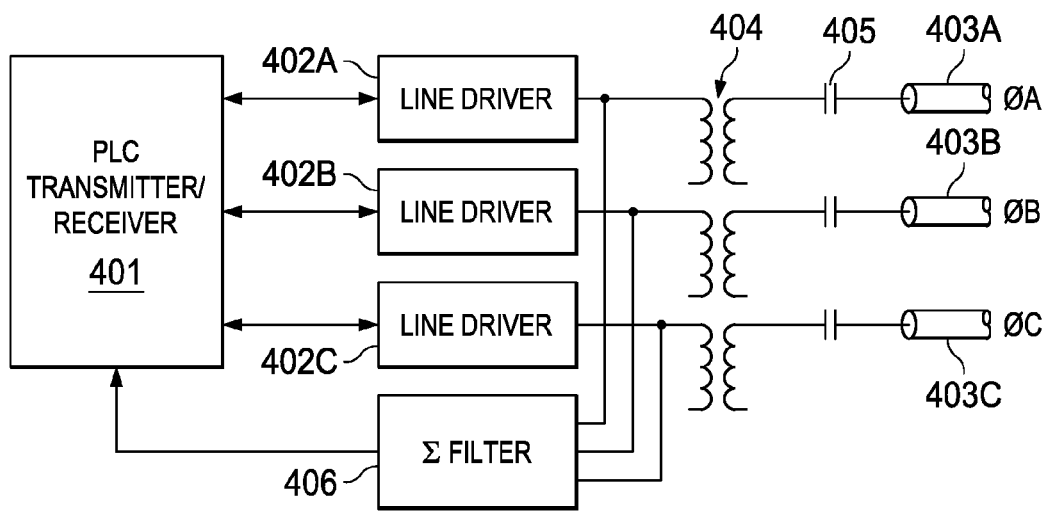
Figure 5:
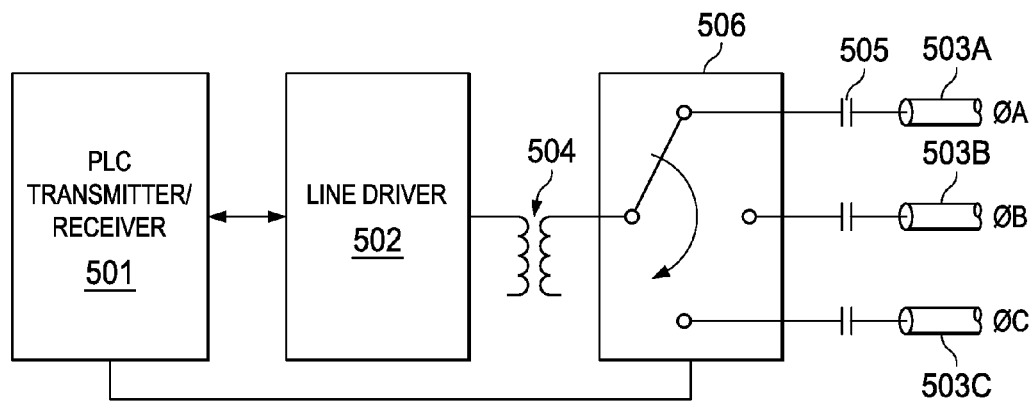
Figure 6:
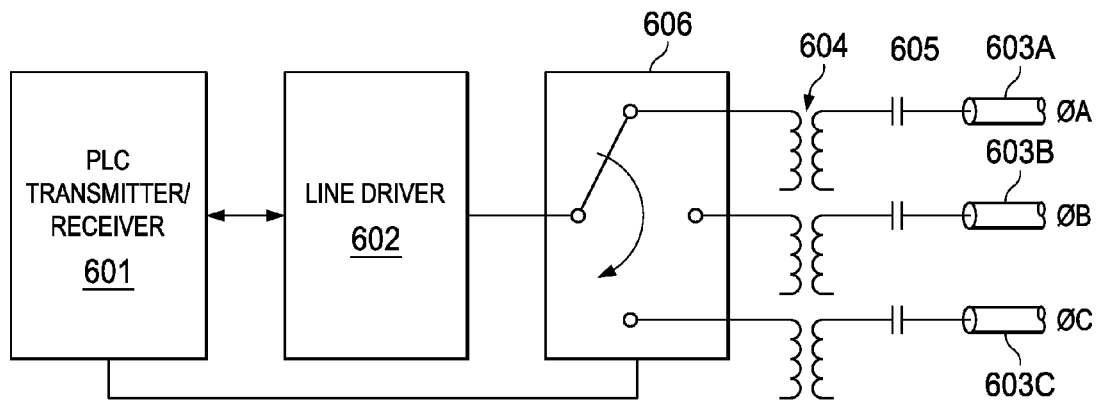

FIGS. 4-6 are block diagrams illustrating connections between a PLC transmitter and/or receiver circuitry to three-phase power lines according to some embodiments.

Figure 7A:
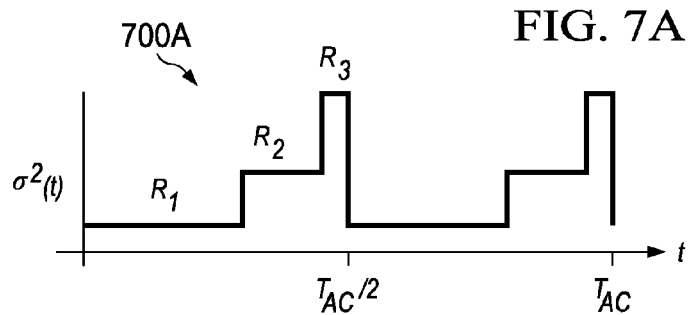

FIG. 7A is a graph illustrating a PLC noise model in the time domain according to some embodiments.

Figure 7B:
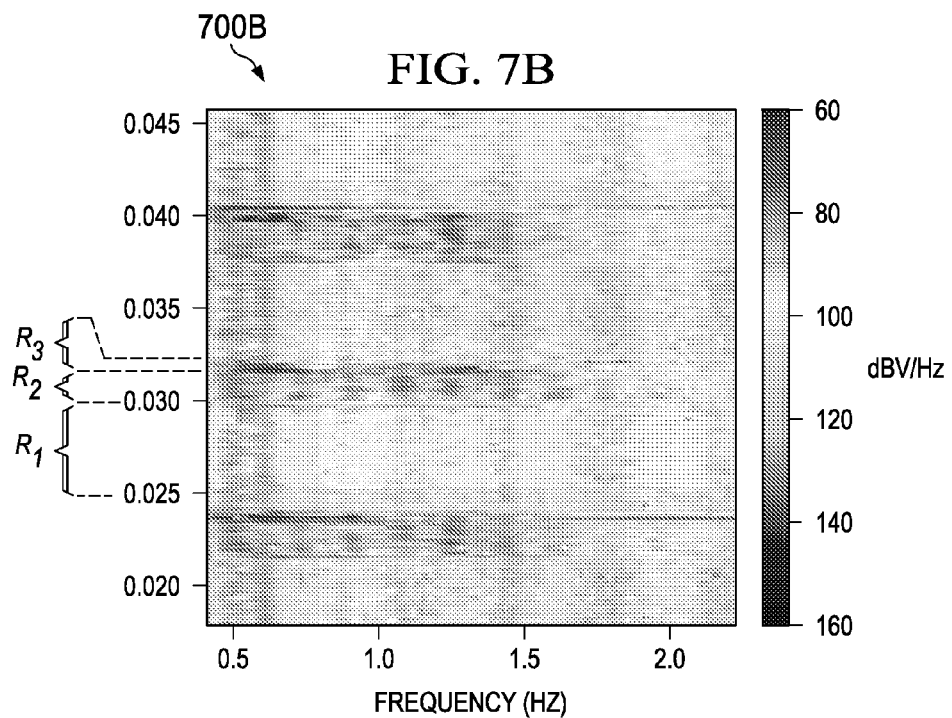

FIG. 7B is a spectrogram illustrating a PLC noise model according to some embodiments.

Figure 7C:
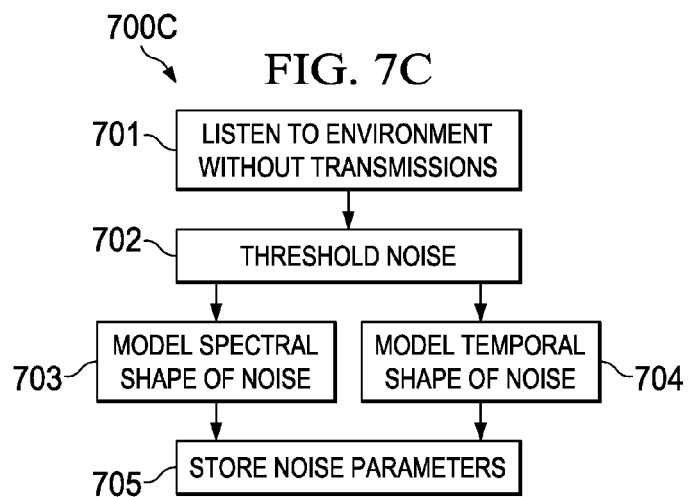

FIG. 7C is a flowchart of a method for determining PLC noise features according to some embodiments.

Figure 8:
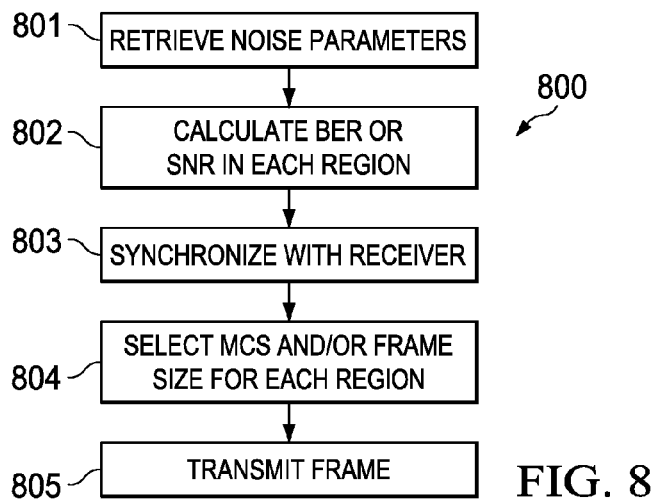

FIG. 8 is a flowchart of a method for adaptively modulating a frame and/or selecting its size using a cyclostationary noise model, according to some embodiments.

Figure 9A:
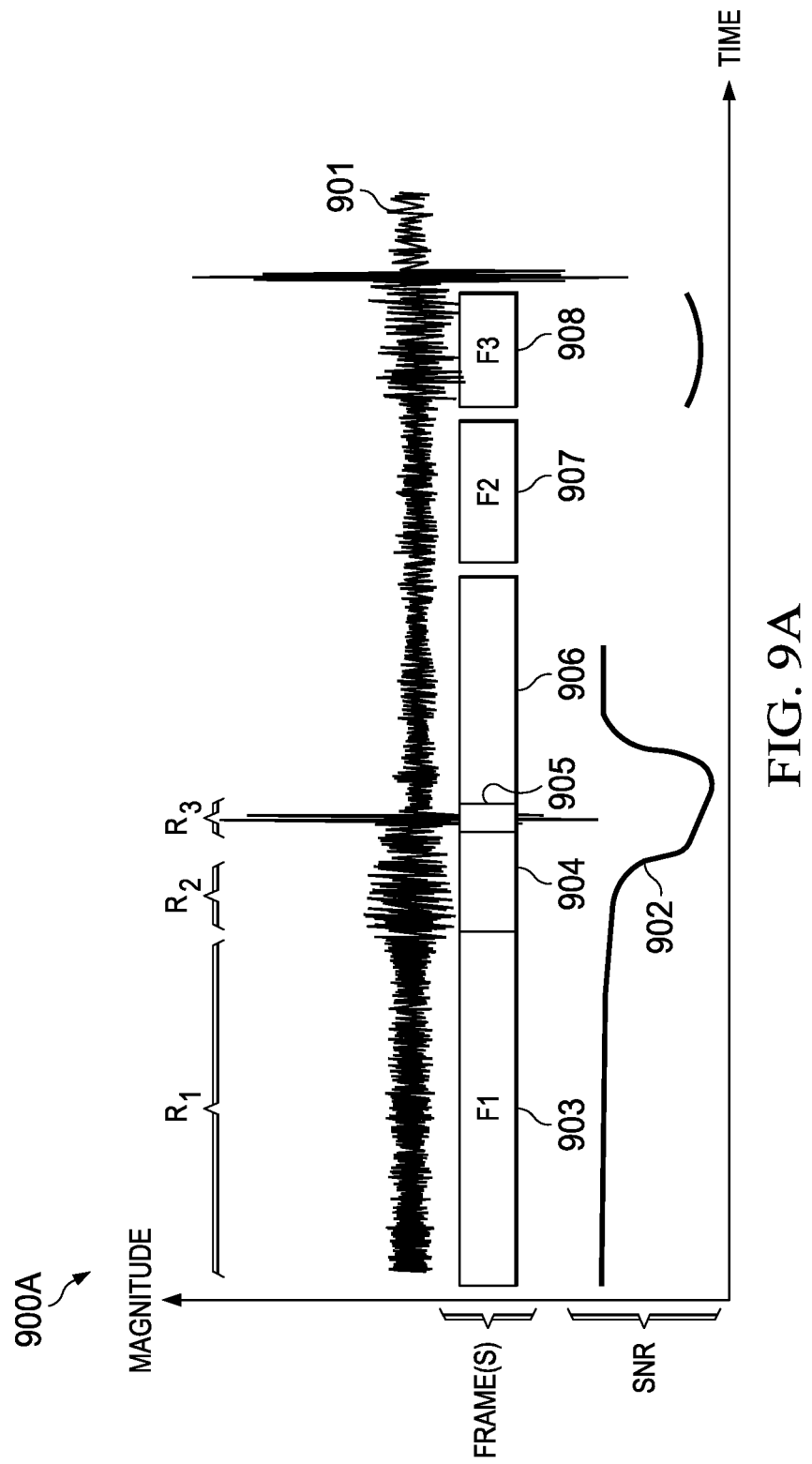

FIG. 9A is a graph illustrating adaptive Modulation and Coding Schemes (MCSs) according to some embodiments.

Figure 9B:
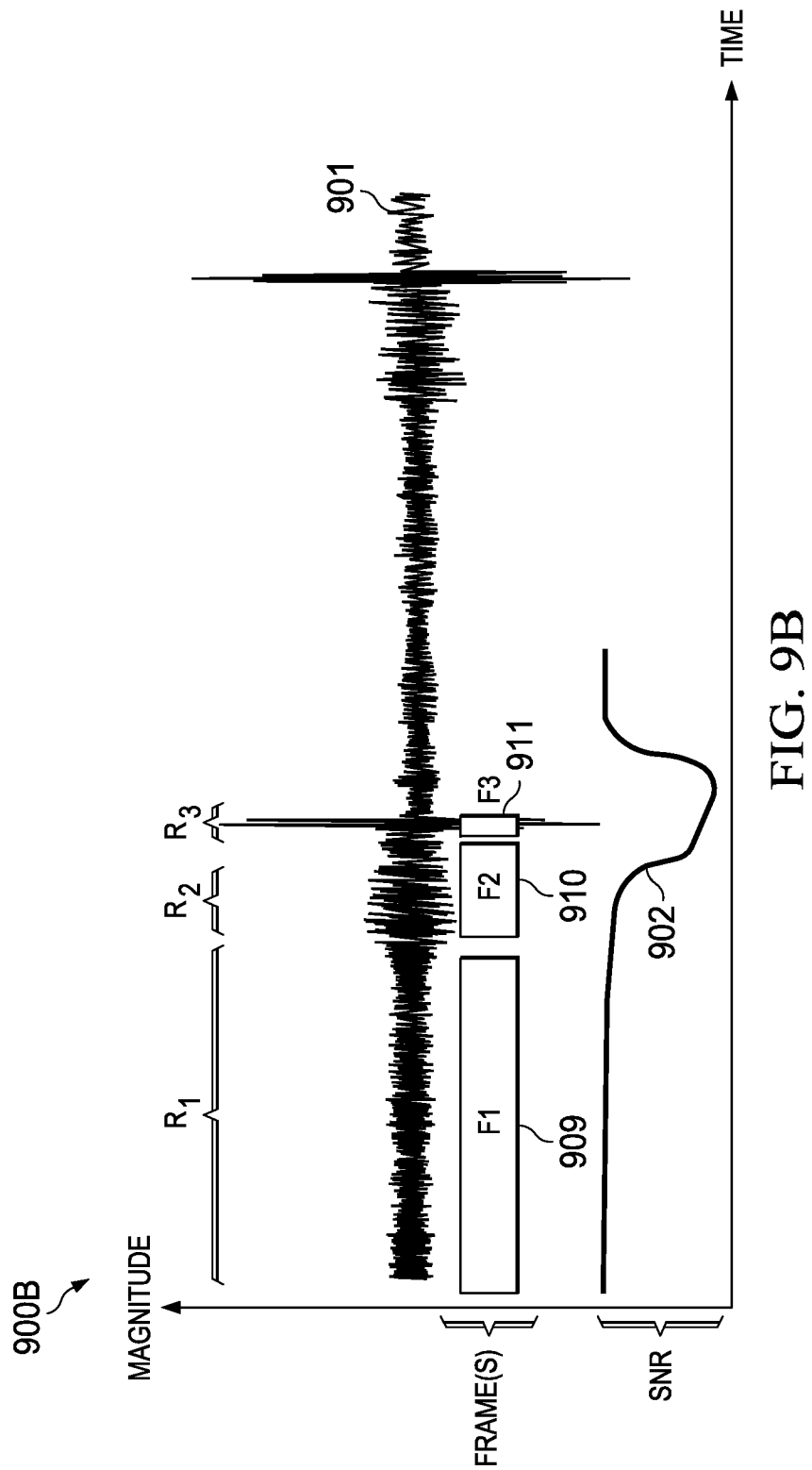

FIG. 9B is a graph illustrating adaptive frame size techniques according to some embodiments.

Figure 10:
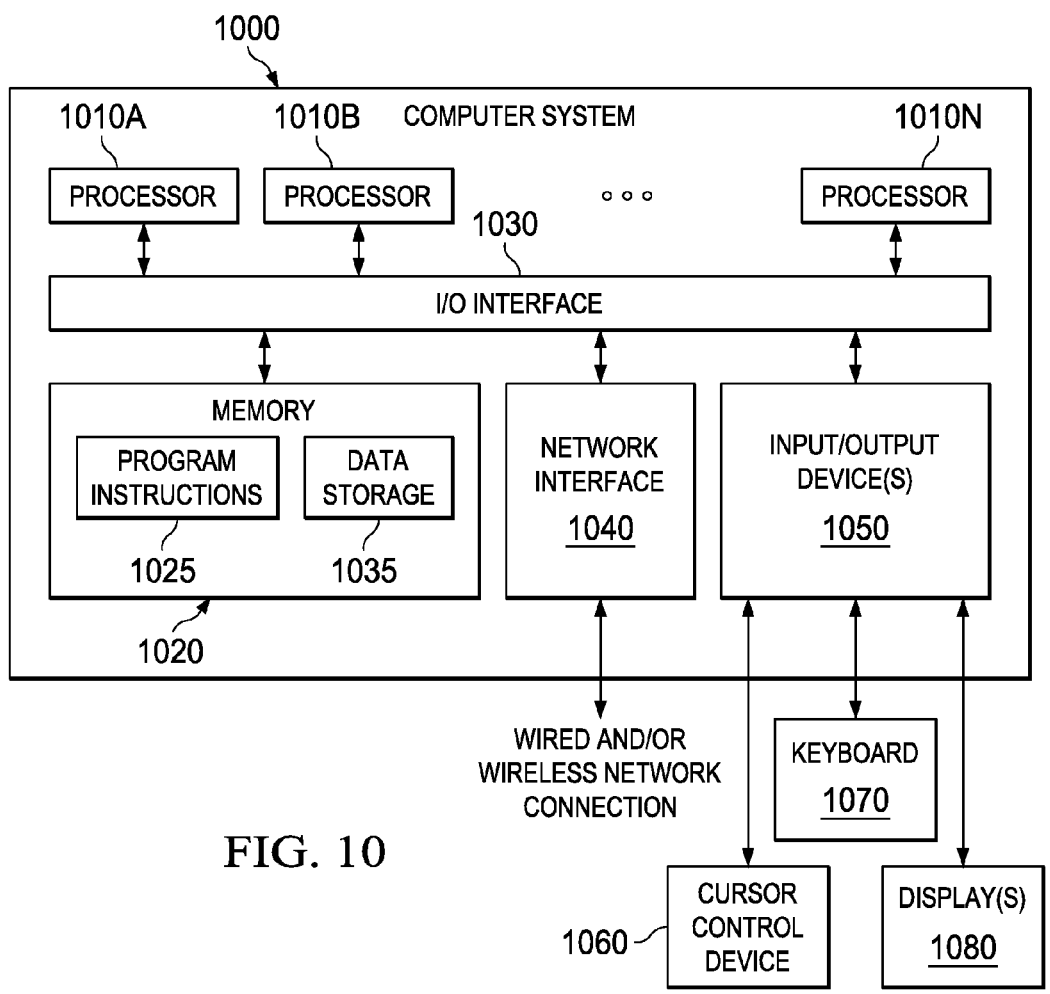

FIG. 10 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to perform adaptive modulation and coding with frame size adjustment. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), Power Line Communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

One of the difficulties facing reliable deployment of PLC systems in the field is the aggressive noise experienced by such systems. PLC noise differs significantly from the typical additive white Gaussian noise (AWGN) present in typical communication systems. In addition, it exhibits significant variations between various sites and times of the day. This presents a design challenge for the communication system that needs to adapt to this noisy environment to provide reliable service. Accordingly, in various embodiments, the systems and methods described herein may enable higher data throughput and/or reliability, for example, by providing adaptive Modulation and Coding Schemes (MCSs) with frame size adjustment techniques based, at least in part, upon a suitable modeling of the noise found in the PLC communications channel. These techniques may be implemented, at least in part, through modifications to the Media Access Control (MAC) portion of the communication protocol being employed. Generally speaking, a MAC protocol is a sub-layer of the data link layer specified in the seven-layer Open Systems Interconnection (OSI) model. Particularly, the MAC protocol may provide addressing and channel access control mechanisms that enable terminals or network nodes (e.g., PLC modems, etc.) to communicate over a shared medium (i.e., a power line).

FIG. 7A is a graph illustrating a PLC noise model in the time domain according to some embodiments. Specifically, the inventors hereof have determined that a suitable model for PLC communication channels has cyclostationary properties that repeat every half an AC period (e.g., 60 Hz*2=120 Hz in most of the U.S.). A "cyclostationary signal" is a signal having statistical properties that vary cyclically with time—i.e., as multiple interleaved stationary processes. In particular, the PLC noise in each period may be divided into multiple regions (typically two, three, or four regions), where the noise has a specific power and spectral signature. As shown in graph 700A, three repeating, temporal noise regions $R_1$, $R_2$, and $R_3$ are depicted, these regions repeating every $T_{AC}/2$ period. In each region, the noise spectral shape remains unchanged. For example, $R_1$ may be a low-power, background noise region (e.g., of duration equal to ~0-5 ms), $R_2$ may be a high-power, interference region (e.g., of duration equal to ~5-7 ms), and $R_3$ may be a broadband impulse (e.g., of duration equal to ~0.3 ms). Accordingly, the noise may be modeled as the response of a linear periodically time-varying (LPTV) system $h[k; \tau]$ to a stationary input $s[k]$, where:

$$h[k, \tau] = \sum_{i=1}^{M} h_i[\tau] 1_{k \in R_i}, 0 \leq k \leq N-1$$

and $h[k+lN; \tau]=h[k; \tau]$ where N is the discrete period corresponding to half the AC-cycle T, $l \in Z$, and $1_A$ is the indicator function ($1_A=1$ if A, 0 otherwise). As a result, the noise $n[k]$ may be given by:

$$n[k] = \sum_{\tau} h[k, \tau] s[\tau] = \sum_{i=1}^{M} 1_{k \in R_i} \sum_{\tau} h_i[\tau] s[\tau]$$

In some cases, the noise model may be parameterized by the number of stationary regions M, the region intervals $\{R_i: 1 \leq i \leq M\}$, and Linear Time-Invariant (LTI) filters $\{h_i[k]: 1 \leq i \leq M\}$. The number of stationary regions M and the region boundaries may be inferred by visually inspecting a spectrogram. Furthermore, the stationary assumption during each interval $R_i$ allows for an efficient automated region detection in the time domain that may be implemented on a PLC receiver. In particular, under the assumption that each LTI filter $h_i[k]$ has a different power $\|h_i\|^2$, each noise sample $n[k]$ may have a power given by:

$$E\{n^2[k]\} = \|h_i\|^2, k \in \mathcal{R}_i$$

due to the stationarity assumption. This means that noise samples within each region have equal powers. As a result, a thresholding operation may be used to differentiate regions in the time-domain. Furthermore, in some implementations, a PLC modem may set the thresholds $\gamma i$ to correspond to its adaptive coding and modulation thresholds, thus estimating only the noise parameters that are relevant to the communication performance.

LTI filters $\{h_i[k]: 1 \leq i \leq M\}$ may be spectrum shaping filters, which may be designed using parametric or non-parametric techniques. Generally speaking, parametric models produce more accurate estimates under the correct model assumptions but tend to degrade under model mismatch. On the other hand, non-parametric models generalize well but suffer from an increased noise floor. In narrowband PLC (e.g., between 0 and 500 kHz), the spectral shapes vary significantly between sites and the time of the day, and may include narrowband interferers. In those cases, non-parametric models may be used. Given an estimate of the spectrum $\hat{S}_i(\omega)$ during $R_i$, an estimate of the autocorrelation sequence $\hat{r}_i(\tau)$ during that same interval may be obtained by taking its Inverse Discrete Fourier Transform (IDFT). This sequence may be then used to design the appropriate spectrum shaping filter $h_i[k]$. In addition, frequency domain filtering using a Fast Fourier Transform (FFT) may be applied using the spectral estimate $\hat{S}_i(\omega)$ followed by an IDFT operation.

An example of the resulting modeling is shown as spectrogram 700B of FIG. 7B. In this illustration, spectral estimates for temporal regions $R_1$, $R_2$, and $R_3$ of FIG. 7A are estimated as $\hat{S}_1(\omega)$, $\hat{S}_2(\omega)$, and $\hat{S}_3(\omega)$, respectively. Applying frequency domain filtering to a unit power AWGN noise, spectrogram 700B shows the fitted model with generated noise samples with spectral and temporal traces.

FIG. 7C is a flowchart of a method for determining PLC noise features. In some embodiments, method 700C may be performed, at least in part, by a PLC device such as described in FIG. 1. At block 701, during a non-transmission period (i.e., when PLC devices coupled to the electric grid are not transmitting packets), a transceiver may listen to the environment or communication channel, and collected samples may be used to estimate noise parameters. For example, at block 702, a threshold detection operation may isolate the different regions of the noise over multiple AC periods. Then, at blocks 703 and 704, for each period, method 700C may estimate the spectral shape using parametric or non-parametric techniques, as well as temporal envelope of the noise, respectively. These estimated parameters may be stored at block 705, and may later be used as features to perform adaptive modulation and coding with frame size adjustment, as discussed in FIGS. 8 and 9 below.

During transmissions, a frame F may be affected by impulsive noise in different ways. Depending on its duration $T_F$, or equivalently its length $L_F$, the frame may be subject to a different temporal and/or spectral portion of the noise (e.g., $R_1$, $R_2$, $R_3$, or combinations thereof). In the PRIME standard, for example, a packet size can have duration between ~2.4 ms to ~50 ms. More generally, the effect of noise on a frame F may be analyzed as follows:

Case A: $T_F > T_{AC}/2$. In this case, the frame may experience at least $[2T_F/T_{AC}]$ impulsive regions. This may lead to a decrease in subcarrier SNR for the affected frame. Assuming two regions: 1) background noise (with power $\sigma_B^2$) and 2) impulse noise (with duration $T_I$ and power $\sigma_I^2$), the SNR may decrease by approximately:

$$\Delta SNR = \left[\frac{2T_F}{T_{AC}}\right] \times \frac{2T_I}{T_{AC}} \times \frac{\sigma_I^2}{\sigma_B^2}.$$

This decrease may then lead to a significant increase in Bit Error Rate (BER), which may then lead to a frame error.

Case B: $T_F < T_{AC}/2$. This case has multiple scenarios. If $T_F > T_{AC}/2 - T_I$, then the frame may still be hit with an impulse with a duration less than $T_I$. On the other hand, if $T_F < T_{AC}/2 - T_I$, then there is a chance that a packet will not be hit by an impulse and may be decoded correctly.

The above analysis indicates that there is a relationship between frame size and frame error rate. This relationship may lead to a compromise between frame size and data rate, since under certain noise conditions increasing the packet size will introduce additional noise that may lead to a frame error. Particularly, the longer a frame is, the more likely it will have a region where cyclostationary noise greatly affects its effective SNR, which may lead to burst errors and the whole frame being lost. Conversely, shorter frames may only see one variance of the noise, and their SNR may remain flat across time.

Accordingly, given the noise model discussed in FIGS. 7A-C, a PLC device may adapt its transmission scheme to satisfy a given communication goal. For example, given a particular set of MCSs, the PLC device may choose a suitable one among the set of MCSs for each temporal region of the cyclostationary noise that achieves a target BER, maximizes throughput, etc. Additionally or alternatively, the PLC device may segment a frame or packet into smaller frames or packets, each with a duration corresponding to the temporal region of the cyclostationary noise that it is expected to be transmitted in.

FIG. 8 is a flowchart of a method for adaptively modulating a frame and/or selecting its size using a cyclostationary noise model, according to some embodiments. In various implementations, a transmitting PLC device such as described above in FIG. 1 may be configured to perform method 800, for example, after having performed method 700C of FIG. 7C. As such, at block 801, the transmitting PLC device may retrieve stored noise parameters. At block 802, the transmitting PLC device may calculate a BER and/or SNR in each repeating temporal region (e.g., $R_1$, $R_2$, $R_3$) of the noise. At block 803, the transmitting PLC device may synchronize one or more parameters with a receiving PLC device. For example, the transmitting PLC device may transmit information about repeating, temporal regions $R_1$, $R_2$, $R_3$ to the receiving PLC device, so as to allow the receiving PLC device to determine how transmitted frames are being encoded, their frame sizes, etc.

At block 804, the transmitting PLC device may select one of a plurality of MCSs and/or a frame size with which to transmit one or more frames during one or more of the temporal regions (e.g., $R_1$, $R_2$, $R_3$) of the cyclostationary noise. This selection may be based, for example, upon the desired BER and/or calculated SNR in each region. For example, an MCS may be selected such to achieve a desired BER with a maximum data rate over the temporal region over which the frame is expected to be transmitted. Additionally or alternatively, the MCS may be selected so as to avoid components of the spectral shape corresponding to the temporal region over which the frame is expected to be transmitted.

For sake of illustration, and not by way of limitation, assume that the following MCSs are available to the transmitting PLC device: Amplitude and Phase Shift Keying (APSK) as Quadrature Amplitude Modulation (QAM) (as high data rate MCSs), Quadrature Phase Shift Keying (QPSK) (as a medium data rate MCS), and Binary Phase Shift Keying (BPSK) (as a low data rate MCS). In such a scenario, if a frame or packet is expected to be transmitted over a background noise region (e.g., an $R_1$ region), then the transmitting PLC device may select APSK or QAM. If the frame or packet is expected to be transmitted over an interference noise region (e.g., an $R_2$ region), then the transmitting PLC device may select QPSK. Moreover, if the frame or packet is expected to be transmitted over an impulse region (e.g., an $R_3$ region), then the transmitting PLC device may select BPSK.

It should be noted, however, that the distinction among the various MCSs in this example is being made for ease of explanation only, and that many variations are within the scope of this disclosure. For example, BPSK may be selected for both interference and impulse regions of the cyclostationary noise depending upon the relative SNR of each region, etc. More generally, in a case where two different MCSs are available, for example, the selection between a first MCS to encode a first portion of the frame and of a second MCS to encode a second portion of the frame may depend upon there being threshold different between the SNR (or other suitable signal quality indicator) between the two temporal regions during which the frame portions are being transmitted. If the difference in SNR between the two temporal portions is greater than the threshold value, then the first MCS may be selected to provide a higher data rate than the second MCS. Conversely, if the difference in SNR is smaller than the threshold value, then the first MCS may be the same as the second MCS. And again, in some cases, among all MCSs available to a transmitting PLC device, the one capable of providing the maximum data throughput for a given BER may be selected for each temporal portion.

Returning to FIG. 8, in some implementations, synchronization block 803 may happen after block 804. For example, information about repeating temporal regions $R_1$, $R_2$, $R_3$, the selected MCS, frame size, number of frames, etc. may be included in a header portion of the frame, or in a separate signaling packet. Then, at block 805, the transmitting PLC device may transmit the frame(s). On the receiver side, the receiving PLC device may obtain the information transmitted by the transmitting PLC device at block 803 and/or within the transmitted frame, and it may decode the received frame using the same MCS with which the frame was encoded.

FIG. 9A is a graph illustrating adaptive Modulation and Coding Schemes (MCSs) according to some embodiments. Particularly, graph 900A shows cyclostationary noise 901 and SNR curve 902 for noise 901. As illustrated, frame F1 includes first portion 903 transmitted during first temporal region $R_1$, second portion 904 transmitted during second temporal region $R_2$, third portion 905 transmitted ruing third temporal region $R_3$, and fourth portion 906 transmitted during a repeat of first temporal region $R_1$. As such, a single frame F1 may include four distinct portions, each portion encoded with an MCS selected based upon SNR curve 902. In contrast, frame F2 is transmitted entirely during a first repeating temporal region $R_1$ (i.e., it has a single portion 907) and third frame F3 is transmitted entirely during a second repeating temporal region $R_2$ (i.e., it has a single portion 908). Following the previous example, with respect to frame F1, portions 903 and 906 may be encoded with APSK or QAM, portion 904 may be encoded with QPSK, and portion 905 may be encoded with BPSK. In frame F2, portion 907 may be encoded with APSK or QAM, for instance, and in frame F3 portion 908 may be encoded with QPSK. In some cases, the size of frames F2 and/or F3 may be selected so as to ensure they remain within a single temporal portion of noise 901.

When the noise power in a certain temporal region is too high to achieve the target BER, or when the receiver does not have the noise parameter estimates, an alternate scheme may be employed. In this scheme, instead of (or in addition to) adapting the modulation within a specific frame or packet, this frame or packet may segmented into smaller frames or packets, each with a duration that corresponds to the temporal region during which the frame or packet it is expected to be transmitted in.

FIG. 9B is a graph illustrating adaptive frame size techniques according to some embodiments. Again, graph 900B shows cyclostationary noise 901 and SNR curve 902 for noise 901. As illustrated, frame F1 is transmitted with a length equal to or smaller than first temporal region $R_1$ (i.e., portion 909), frame F2 is transmitted with a length equal to or smaller than second temporal region $R_2$ (i.e., portion 910), and frame F3 is transmitted with a length equal to or smaller than third temporal region $R_3$ (i.e., portion 911). Still following the previous example, F1 may be encoded with APSK or QAM, F2 may be encoded with QPSK, and F3 may be encoded with BPSK. Here, the sizes of frames F1, F2, F3 may be selected so as to ensure they remain within a respective one of the repeating temporal portions of noise 901. In some cases, a longer frame may be split into smaller frames with different MCSs (e.g., F1 in FIG. 9A may be segmented to result in F1-F3 in FIG. 9B).

Referring to FIGS. 9A and 9B, it should be noted that, when segmenting a frame into smaller frames that fit into a single temporal region of the cyclostationary noise, it may not be necessary for the receiver to know the noise parameters. For example, the MCS of each of the smaller frames may be indicated in the header of those frames. Also, in some cases, the transmitter may simply avoid transmitting frames when an acceptable BER cannot be achieved (e.g., during temporal region $R_3$).

In certain embodiments, one or more of the techniques described above may be executed, at least in part, by one or more communication devices and/or computer systems. One such computer system is illustrated in FIG. 10. In various embodiments, system 1000 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1000 includes one or more processor (s) 1010A-N coupled to a system memory 1020 via an input/output (I/O) interface 1030. Computer system 1000 further includes a network interface 1040 coupled to I/O interface 1030, and one or more input/output devices 1025, such as cursor control device 1060, keyboard 1070, display(s) 1080, and/or mobile device 1090. In various embodiments, computer system 1000 may be a single-processor system including one processor 1010, or a multi-processor system including two or more processors 1010A-N (e.g., two, four, eight, or another suitable number). Processors 1010 may be any processor capable of executing program instructions. For example, in various embodiments, processor(s) 1010A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1010A-N may commonly, but not necessarily, implement the same ISA. Also, in some embodiments, at least one processor 1010A-N may be a graphics processing unit (GPU) or other dedicated graphics-rendering device.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include any tangible storage media or memory media such as magnetic or optical media—e.g., disk or CD/DVD-ROM coupled to computer system 1000 via I/O interface 1030. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1040.

In an embodiment, I/O interface 1030 may be configured to coordinate I/O traffic between processor(s) 1010A-N, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor(s) 1010A-N). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor(s) 1010A-N.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, mobile devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 configured to implement certain embodiments described herein (e.g., implementing one or more operations shown in FIGS. 7C, 8, and/or 9A), and data storage 1035 comprising various data accessible by program instructions 1025. In an embodiment, program instructions 1025 may include software elements of embodiments illustrated in the above figures. For example, program instructions 1025 may be implemented in various embodiments using any desired programming language, scripting language, or combination of programming languages and/or scripting languages (e.g., C, C++, C#, JAVA®, JAVASCRIPT®, PERL®, etc.). Data storage 1035 may include data that may be used in these embodiments (e.g., recorded communications, profiles for different modes of operations, etc.). In other embodiments, other or different software elements and data may be included.

A person of ordinary skill in the art will appreciate that computer system 1000 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:
1. A method, comprising:
identifying a temporal region of a cyclostationary noise over which a frame is to be sent across a Power Line Communications (PLC) network, the cyclostationary noise having a plurality of temporal regions, each of the plurality of temporal regions having a distinct spectral shape;

applying a given one of a plurality of Modulation and Coding Schemes (MCSs) to the frame to produce a modulated frame, wherein the given one of the plurality of MCSs is selected based, least in part, upon the spectral shape corresponding to the identified temporal region; and transmitting the modulated frame across the PLC network, at least in part, over the identified temporal region.

2. The method of claim 1, wherein the given one of the plurality of MCSs is selected such that a data rate with which the frame is transmitted is inversely proportional to a Signal to Noise Ratio (SNR) corresponding to the identified temporal region.

3. The method of claim 1, wherein the given one of the plurality of MCSs is selected to avoid using spectral components of the spectral shape corresponding to the identified temporal region.

4. The method of claim 1, wherein the identified temporal region includes a background noise region, and wherein the given one of the plurality of MCSs is selected from the group consisting of: Amplitude and Phase Shift Keying (APSK) and Quadrature Amplitude Modulation (QAM).

5. The method of claim 1, wherein the identified temporal region includes an interference noise region, and wherein the given one of the plurality of MCSs is selected from the group consisting of: Binary Phase Shift Keying (BPSK), and Quadrature Phase Shift Keying (QPSK).

6. The method of claim 1, wherein the identified temporal region includes an impulse region, and wherein the given one of the plurality of MCSs is a Binary Phase Shift Keying (BPSK).

7. The method of claim 1, further comprising, prior to applying the given one of the plurality of MCSs to the frame, selecting a size of the frame such that the frame does not occupy two or more of the plurality of temporal regions.

8. The method of claim 1, further comprising, prior to transmitting the modulated frame, synchronizing one or more parameters of the cyclostationary noise with a receiving PLC device.

9. A Power Line Communications (PLC) device having a processor and a memory coupled to the processor, the memory configured to store program instructions executable by the processor to cause the PLC device to:

transmit a frame over a PLC network, the frame including a first portion and a second portion, the first portion transmitted during a first temporal region of a cyclostationary noise and the second portion transmitted during a second temporal region of the cyclostationary noise, the first and second temporal regions of the cyclostationary noise having different spectral shapes, the first portion of the frame transmitted with a first Modulation and Coding Scheme (MCS) matching the spectral shape of the first temporal region, the second portion of the frame transmitted with a second MCS matching the spectral shape of the second temporal region, and the first MCS different from the second MCS.

10. The PLC device of claim 9, wherein the first and second MCSs are selected such that data rates with which the first and second portions of the frame are transmitted are maximized to achieve desired Bit Error Rates (BERs) during the first and second temporal regions, respectively.

11. The PLC device of claim 9, wherein the first MCS is configured to avoid components of the spectral shape corresponding to the first temporal region, and wherein the second MCS is configured to avoid components of the spectral shape corresponding to the second temporal region.

12. The PLC device of claim 9, wherein the first temporal region is a background noise region, wherein the first MCS is selected from the group consisting of: Amplitude and Phase Shift Keying (APSK) and Quadrature Amplitude Modulation (QAM), wherein the second temporal region is an interference noise region, and wherein the second MCS is selected from the group consisting of: Binary Phase Shift Keying (BPSK), and Quadrature Phase Shift Keying (QPSK).

13. The PLC device of claim 9, wherein the first temporal region is an interference noise region, wherein the first MCS is selected from the group consisting of: Binary Phase Shift Keying (BPSK), and Quadrature Phase Shift Keying (QPSK), wherein the second temporal region is a broadband impulse region, and wherein the second MCS is Binary Phase Shift Keying (BPSK).

14. The PLC device of claim 9, wherein the program instructions are executable by the processor to further cause the PLC device to transmit, in the frame, an indication of a duration of at least one of the first or second portions.

15. The PLC device of claim 9, wherein the program instructions are executable by the processor to further cause the PLC device to transmit, in the frame, an indication of at least one of the first or second MCSs.

16. A non-transitory electronic storage medium having program instructions stored thereon that, upon execution by a processor within a Power Line Communications (PLC) device, cause the PLC device to:

receive a modulated frame over at least one of a plurality of temporal regions of a cyclostationary noise, each of the plurality of temporal regions having a corresponding spectral shape; and apply a selected one of a plurality of Modulation and Coding Schemes (MCSs) to the modulated frame to produce a demodulated frame, wherein the selected MCS is chosen, at least in part, as a function of the at least one of the plurality of temporal regions.

17. The non-transitory electronic storage medium of claim 16, wherein the at least one temporal region includes a background noise region, and wherein the selected one of the plurality of MCSs is selected from the group consisting of: Amplitude and Phase Shift Keying (APSK) and Quadrature Amplitude Modulation (QAM).

18. The non-transitory electronic storage medium of claim 16, wherein the at least one temporal region includes an interference noise region, and wherein the selected one of the plurality of MCSs is selected from the group consisting of: Binary Phase Shift Keying (BPSK), and Quadrature Phase Shift Keying (QPSK).

19. The non-transitory electronic storage medium of claim 16, wherein the at least one temporal region includes an impulse region, and wherein the selected one of the plurality of MCSs is Binary Phase Shift Keying (BPSK).

20. The non-transitory electronic storage medium of claim 16, wherein the at least one of the plurality of temporal regions includes a first and second temporal regions and wherein applying the selected one of the plurality of MCSs to the modulated frame includes applying a first MCS to a first portion of the frame received over the first temporal region and applying a second MCS to a second portion of the frame received over the second temporal region, the first MCS different from the second MCS.

* * * * *